United States Patent [19]

Clifford

[11] 4,210,814
[45] Jul. 1, 1980

[54] CONTROL OF PYROPHORICITY IN DEPOSITS PRODUCED BY ELECTRON BEAM EVAPORATION OF URANIUM

[75] Inventor: John C. Clifford, Richland, Wash.

[73] Assignee: Jersey Nuclear-Avco Isotopes, Inc., Bellevue, Wash.

[21] Appl. No.: 867,678

[22] Filed: Jan. 9, 1978

[51] Int. Cl.² .............................................. H01J 27/00
[52] U.S. Cl. ................................... 250/427; 250/284; 250/423 P
[58] Field of Search ................ 250/423 P, 427, 281, 250/282, 283, 284, 425, 424, 398, 443, 289

[56] References Cited

U.S. PATENT DOCUMENTS

| 3,758,777 | 9/1973 | Brunnee | 250/427 |
| 3,772,519 | 11/1973 | Levy et al. | 250/284 |
| 3,939,354 | 2/1976 | Janes | 250/284 |
| 4,039,828 | 8/1977 | Pokar | 250/427 |
| 4,090,086 | 5/1978 | Cranberg | 250/282 |

Primary Examiner—Harold A. Dixon
Attorney, Agent, or Firm—Weingarten, Maxham & Schurgin

[57] ABSTRACT

Apparatus to reduce pyrophoricity in deposits collected upon collection plates within a chamber employed for vapor deposition. The apparatus is preferably employed in a chamber utilized for isotopically selective photoexcitation, ionization and separation of metallic uranium vapor. The uranium vapor which collects on all surfaces exposed to it within the chamber is caused to collect in a relatively dense, non-porous body by maintaining a suitably elevated temperature for those surfaces while at the same time keeping the chamber itself cooled. The elevated temperature is achieved by baffles shielding the collection plates from the cooler chamber walls to reduce thermal radiation thereto and/or by applying additional thermal energy to the plates.

19 Claims, 2 Drawing Figures

CONTROL OF PYROPHORICITY IN DEPOSITS PRODUCED BY ELECTRON BEAM EVAPORATION OF URANIUM

FIELD OF THE INVENTION

The present invention relates to vapor deposition and in particular to the reduction of pyrophoricity in vapor deposition of a material reactive with atmospheric components.

BACKGROUND OF THE INVENTION

In the technique of laser enrichment utilizing isotopically selective ionization of a vapor flow of metallic uranium as shown in U.S. Pat. Nos. 3,772,519 and 3,939,354, one or more evacuated chambers are utilized. The chambers are typically evacuated to a pressure of a small fraction of a millitorr. Uranium vapor is generated within the atmosphere preferably by electron beam vaporization techniques with the resulting vapor expansion directed toward a region of collection and accelerating electrodes where the desired U-235 isotope is separated by photoionization and crossed-field MHD acceleration techniques. While the vapor source temperature is in excess of 1000° C, the chamber within which the apparatus is placed is typically cooled to protect such elements as elastomeric vacuum seals located throughout the chamber walls. Radiative cooling of the electrode and collection plate structure of the ion extractor to the far colder walls will result also. The waste vapor, that depleted of the U-235 isotope, is collected on a set of upper surfaces which also are cooled by radiative heat loss to the chamber walls. In addition, the chamber walls themselves due to cooling are at a reduced temperature.

The uranium vapor generated in the chamber will collect to a greater or lesser degree upon all these surfaces. At the various plate temperatures assumed under these conditions, which may be all or nearly all below 400° or 450° C, the uranium tends to collect as a mass of relatively low density, substantially below the theoretical maximum density of the material. Such a deposition has a high surface area to volume ratio which can create a condition of pyrophoricity, that is self combustion, of the uranium deposits when the chambers are exposed to the atmosphere. This may occur when the chambers are opened for servicing or removal of the deposits. Among other problems, the pyrophoricity of the deposits results in a loss of the enriched uranium when exposed to the atmosphere. While it is possible to open the chambers in an inert atmosphere for service and for deposit collection, it is preferable to be able to operate upon the open chambers in the normal atmospheric environment.

BRIEF SUMMARY OF THE INVENTION

In accordance with the teaching of the present invention, apparatus is employed particularly for use within such a chamber employed for isotopically selective photoionization and collection of uranium metal for maintaining at an elevated temperature all surfaces upon which the uranium vapor, in the enriched, depleted, or unaffected portions, may collect, while maintaining the cooling of the chamber walls. The elevated temperature is selected to be below the temperature at which alloying of the uranium and plate metal, typically stainless steel, will significantly result, but sufficiently high to permit deposition of the uranium at a less pyrophoric density. The maintenance of this elevated temperature is achieved by a set of baffles or shrouds which effectively shield the surfaces upon which the uranium vapor deposits from the cooled surfaces of the chamber walls.

While some uranium deposits may not self combust when exposed to the atmosphere, they can be ignited by contact with self combusting uranium. Accordingly, the chamber lineer is provided in a segmented structure which lessens the possibility that a region of combusting uranium can ignite other deposits throughout the chamber.

BRIEF DESCRIPTION OF THE DRAWING

These and other features of the present invention are more fully set forth below in the detailed description of the invention, presented for purposes of illustration and not by way of limitation and in the accompanying drawing of which.

DETAILED DESCRIPTION OF THE INVENTION

The present invention contemplates a technique for depositing a material from a vapor state in a manner controlled to reduce the spontaneous combustion reactivity of the deposits to reactive gases such as found in the atmosphere.

In the setting of uranium enrichment employing a uranium vapor generated within a low pressure chamber, the uranium will deposit upon collection surfaces as well as chamber walls which happen to lie in the path of the vapor flow without creating a substantial potential for reaction of the deposit with the low pressure atmosphere. At least portions of the containment chamber for the vapor environment are cooled to prevent excessive heating of the chamber walls thus, prior to the invention at least significant portions of the surfaces where the uranium collects will be at cooled temperatures well under 450° C. Due to radiative cooling of these surfaces to the relatively cold chamber walls, the collection surfaces which are below these temperatures may in some cases also include the structure of electrodes and collection surfaces employed to receive the separated isotopes.

At such temperatures uranium deposits from the vapor state tend to collect as a low density, porous material. Such a structure has an extremely large surface area compared to the mass of the material deposited or original surface area of the plate upon which the deposition occurs.

Such deposits of a reactive material like uranium can readily combust when exposed to the air creating an undesirable burning condition as well as contributing to a loss of the collected, enriched product. This undesirable condition is substantially lessened in accordance with the teaching of the present invention in which the collection plates for the depositing vapor components are maintained at an elevated temperature at which the deposits collecting thereon accumulate in a relatively dense mass which may be about 50% or more of the theoretical limit of maximum density. Other uranium deposits on various chamber surfaces are also collected in a relatively compact mass to prevent them from combusting and acting as a fuse for the enriched and depleted uranium deposits.

Figure 1:
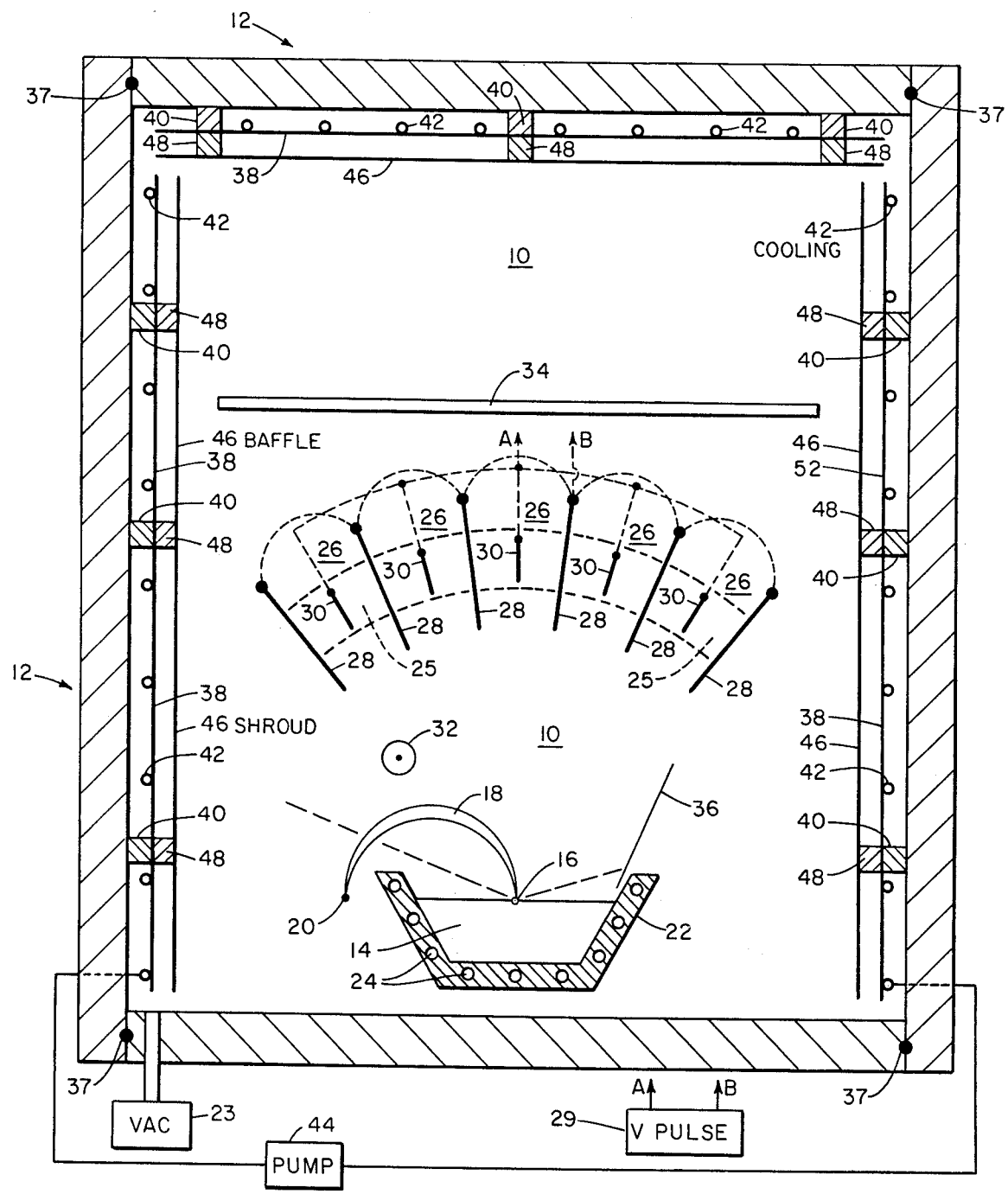
FIG. 1 is a cross-sectional interior view of a chamber for isotope separation in which the present invention is preferably utilized.

Apparatus providing this improvement is illustrated in FIG. 1. As shown there a chamber 10 defined by enclosure 12, typically of stainless steel, contains a reservoir 14 of the material to be evaporated, elemental uranium in the utilization of the invention for isotope separation. The uranium material is vaporized by the energy imparted to it along a line 16, extending into and out of the page, from an electron beam 18 emitted by a linear filamentary source 20. The reservoir 14 of uranium is contained within a crucible 22 which may be of copper and is preferably cooled by a plurality of cooling ports 24. The chamber 10 is evacuated to a low pressure of a fraction of a millitorr by a vacuum system 23.

Uranium evaporates from the line 16 in a cosine distribution to expand upward in generally all directions above the surface of the reservoir 14. In particular, the vapor is directed into a series of chambers 26 defined by a set of radially extending collection plates 28 which are connected in common to a voltage pulse circuit 29 for the application of an electric field directly or indirectly within the chambers 26 between the plates 28 and interior anode plates 30. According to the technique of laser enrichment as indicated in the above-identified U.S. Pat. Nos. 3,772,519 and 3,939,354, the uranium vapor within the chambers 26 is selectively ionized in the U-235 isotope by isotopically selective ionizing radiation in laser beams 25 (shown in section) and directed for collection upon one set of plates 28 in each chamber 26 by the interaction of the electric field applied between plates 28 and 30, and an axial magnetic field 32 utilized within the chamber for both ion separation and focusing of the electron beam 18. Un-ionized vapor particles continue beyond the chambers 26 for collection upon a surface or set of surfaces 34 as depleted uranium. Other portions of the vapor flow or drift toward the sidewalls 12 of the chamber 10, even in the presence of some collimation baffles such as structure 36 preferably provided directly above and to the side of the crucible 22 to limit the angle of vapor flow.

The walls 12 of the chamber 10 are to be kept cooler than the interior heated by the vaporization energy to prevent damage to elastomeric seals such as O-rings 37 and other elements provided in or through the walls. This may be accomplished directly by cooling within the walls 12 but is preferably achieved by cooled shrouds 38 positioned around the interior of the chamber 10 and placed a short distance from the top and vertical walls 12 by spacers 40. Cooling tubes 42 are affixed to the shrouds 38 on the side facing walls 12 and a circulating coolant such as water is driven through them by a pump 44. Shrouds 38 may typically be of copper for good thermal conduction.

The surfaces 28, 30 and 34 heated by the hot vapor of uranium could be cooled by radiative thermal loss to the shrouds 38. The resulting lowered temperature of the surfaces facing the chambers where the uranium vapor collects, promotes the accumulation of uranium in a low density, high porosity, high surface area condition which as indicated above can lead to pyrophoricity upon exposure to normal atmosphere.

Such a condition is avoided in the present invention by baffles 46 placed between shrouds 38 and the chamber 10 interior to provide collecting surfaces isolated from the cooled chamber walls and to permit utilization of thermal energy in the uranium vapor to elevate the temperature of the various collecting plates substantially above the range of 400° or 450° C., but preferably below the temperature at which significant interdiffusion of the various species comprising the deposit and collecting surfaces, typically stainless steel or titanium, would occur. In the embodiment shown in FIG. 1, this isolation is provided by supporting baffles 46 from the walls 12 of chamber 10 by further spacers 48 between shrouds 38 and baffles 46. The baffles 46 may include one or more layers of material to insure that their radiatively cooled outer surfaces, facing toward shrouds 38, are insulated from the inner facing surfaces on which the uranium collects. Additional baffling may be provided within the chamber 10 to further elevate the temperatures of the plates 28 and 34 as desired. The baffling preferably segments the deposits to limit contact between uranium deposits and thus limit the spread of combusting uranium.

Figure 2:
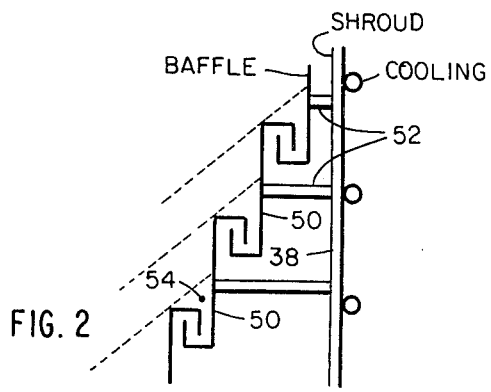
FIG. 2 is a sectional view of a modified portion of the lineer represented in FIG. 1.

In FIG. 2, a highly segmented form for the baffle 46 is illustrated in which baffling is accomplished by an array of overlapped, non-touching plates 50 supported by struts 52 from the shrouds 38. Plates 50 may be of similar construction to baffle 46. The segmenting of the baffle in this manner isolates regions of potential pyrophoricity to act as a fire break. The construction provides shadow regions 54 where shoulders 56 on plates 50 eliminate vapor deposit. The vapor thus deposits in isolated strips.

The above-described embodiment is intended as exemplary only. Alternations and improvements are intended to fall within the scope of the invention as defined only in the following claims.

What is claimed is:

1. Apparatus for reducing the pyrophoricity of deposits of a material evaporated within a chamber comprising:

a sealed chamber defined by an enclosure;
means for providing within said chamber an atmosphere of generally non-reactive nature;
a reservoir of a material to be evaporated;
means for directing a vapor of said material from said reservoir into said chamber;
at least one surface within said chamber in the path of the directed vapor and on which at least portions of the vaporized material deposits;
means for cooling said enclosure to a temperature at which said vapor deposits at a relatively low pyrophoric density; and
means for maintaining a temperature for said collection surfaces higher than the enclosure temperature to promote deposition of said material at a relatively higher density.

2. The apparatus of claim 1 wherein said material is uranium.

3. The apparatus of claim 2 wherein said surface includes stainless steel.

4. The apparatus of claim 2 wherein said surface includes titanium.

5. The apparatus of claim 2 wherein said enclosure temperature is below 400C.

6. The apparatus of claim 2 wherein said enclosure temperature is below the rapid deterioration temperature of elastomeric seals of said enclosure.

7. The apparatus of claim 1 wherein plural collection surfaces are provided within said chamber.

8. The apparatus of claim 7 further including means for producing depositions on said plural surfaces in isotopic concentrations different from in said vapor.

9. The apparatus of claim 7 wherein said means for maintaining a higher temperature includes means for shielding said collection surfaces from thermal radiation to said enclosure.

10. The apparatus of claim 9 wherein said means for maintaining said collection surfaces at a higher temperature includes a baffle between said enclosure and said chamber interior.

11. The apparatus of claim 10 wherein said baffle includes a stainless steel plate.

12. The apparatus of claim 11 wherein said stainless steel plate is supported from said enclosure.

13. The apparatus of claim 10 wherein said baffle includes a plurality of separate plates.

14. The apparatus of claim 1 wherein said means for generating a vapor includes an electron beam evaporator.

15. The apparatus of claim 1 wherein said means for cooling said chamber includes a cooled shroud internal of and adjacent the walls of said enclosure.

16. The apparatus of claim 15 wherein said shroud is of copper.

17. The apparatus of claim 15 wherein said shroud has a conduit carrying a cooling fluid affixed thereto on the side facing said enclosure.

18. The apparatus of claim 17 wherein said higher temperature maintaining means includes a baffle between said shroud and the chamber interior.

19. The apparatus of claim 1 wherein said relatively higher density is on the order of at least 50% theoretical maximum density.

* * * * *